United States Patent
Sung et al.

(10) Patent No.: US 10,957,073 B2
(45) Date of Patent: Mar. 23, 2021

(54) METHOD AND APPARATUS FOR RECOGNIZING IMAGE AND METHOD AND APPARATUS FOR TRAINING RECOGNITION MODEL BASED ON DATA AUGMENTATION

(71) Applicant: Samsung Electronics Co., Ltd., Suwon-si (KR)

(72) Inventors: Jaemo Sung, Hwaseong-si (KR); Chang hyun Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 138 days.

(21) Appl. No.: 16/264,752

(22) Filed: Feb. 1, 2019

(65) Prior Publication Data
US 2020/0065992 A1    Feb. 27, 2020

(30) Foreign Application Priority Data
Aug. 23, 2018   (KR) .................. 10-2018-0098754

(51) Int. Cl.
*G06T 7/77*   (2017.01)
(52) U.S. Cl.
CPC ...... *G06T 7/77* (2017.01); *G06T 2207/20081* (2013.01)
(58) Field of Classification Search
CPC . G06T 7/77; G06T 2207/20081; G06N 3/084; G06N 3/0454; G06N 3/0445; G06N 3/0472; G06K 9/6265; G06K 9/40; G06K 9/6256; G06K 9/6267
See application file for complete search history.

(56) References Cited

U.S. PATENT DOCUMENTS

| | | |
|---|---|---|
| 9,836,839 B2 | 12/2017 | Champlin et al. |
| 2017/0200092 A1 | 7/2017 | Kisilev |
| 2017/0270593 A1 | 9/2017 | Sherman et al. |
| 2017/0277955 A1 | 9/2017 | Liu et al. |
| 2019/0130110 A1* | 5/2019 | Lee ................... G06N 5/041 |
| 2020/0019863 A1* | 1/2020 | Dua ................... G06K 9/6263 |

OTHER PUBLICATIONS

Bloice, Marcus D., Christof Stocker, and Andreas Holzinger. "Augmentor: an image augmentation library for machine learning." arXiv preprint arXiv:1708.04680 (2017). (Year: 2017).*
Krizhevsky, Alex et al., "ImageNet Classification with Deep Convolutional Neural Networks", Advances *in Neural Information Processing Systems*, Jan. 2012 (9 pages in English).
Fawzi, Alhussein, et al., "Adaptive Data Augmentation for Image Classification", *2016 IEEE International Conference on Image Processing (ICIP)*, Jan. 2019. pp. (3688-3692).
(Continued)

*Primary Examiner* — Kim Y Vu
*Assistant Examiner* — Molly Delaney
(74) *Attorney, Agent, or Firm* — NSIP Law

(57) ABSTRACT

An image recognition method includes: selecting an augmentation process from augmentation processes based on a probability table, in response to an acquisition of an input image; acquiring an augmented image by augmenting the input image based on the selected augmentation process; and recognizing an object from the augmented image based on a recognition model.

18 Claims, 11 Drawing Sheets

(56) References Cited

OTHER PUBLICATIONS

"Caffe Turtorial", https://github.comkevinlin311twcaffe-augmentation, *Github*, Mar. 16, 2016.
"Caffe-Augmentation", https://github.comkevinlin311twcaffeaugmentationblobmasterdocstutorialindex.md, *Github* Mar. 16, 2016.
Hu, Weihua, et al. "Learning Discrete Representations via Information Maximizing Self-Augmented Training", arXiv preprint arXiv:1702.08720, Jun. 14, 2017, (15 pages in English). Taylor, Luke et al., "Improving Deep Learning using Generic Data Augmentation", arXiv preprint arXiv:1708.06020, Aug. 20, 2017 (6 pages in English). Wang, Jason et al., "The Effectiveness of Data Augmentation in Image Classification using Deep Learning," arXiv preprint arXiv:1712.04621, Dec. 13, 2017 (8 pages in English). Allred, Ryan, "Image Augmentation for Deep Learning using Keras and Histogram Equalization", Towards *Data Science*, Oct. 12, 2018 19 pages in English).
Taylor, Luke et al., "Improving Deep Learning using Generic Data Augmentation", arXiv preprint arXiv:1708.06020, Aug. 20, 2017 (6 pages in English).
Wang, Jason et al., "The Effectiveness of Data Augmentation in Image Classification using Deep Learning," arXiv preprint arXiv:1712.04621, Dec. 13, 2017 (8 pages in English).
Allred, Ryan, "Image Augmentation for Deep Learning using Keras and Histogram Equalization", Towards *Data Science*, Oct. 12, 2018 19 pages in English).

* cited by examiner

(54) METHOD AND APPARATUS FOR RECOGNIZING IMAGE AND METHOD AND APPARATUS FOR TRAINING RECOGNITION MODEL BASED ON DATA AUGMENTATION

CROSS-REFERENCE TO RELATED APPLICATIONS

This application claims the benefit under 35 USC § 119(a) of Korean Patent Application No. 10-2018-0098754, filed on Aug. 23, 2018, in the Korean Intellectual Property Office, the entire disclosure of which is incorporated herein by reference for all purposes.

BACKGROUND

1. Field

The following description relates to a technology associated with a data augmentation for a training and a recognition of a recognition model.

2. Description of Related Art

Recently, to address an issue of classifying an input pattern as a predetermined group, research is being actively conducted on applying an efficient pattern recognition method to a computer. The research includes research on an artificial neural network (ANN). To address the above issue, the ANN employs an algorithm that implements learning abilities. The ANN generates mapping between input patterns and output patterns using the algorithm, and a capability of generating the mapping is expressed as a learning capability of the ANN. Also, the ANN has a generalization capability to generate a relatively correct output with respect to an input pattern that has not been used for training based on a training result.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an image recognition method includes: selecting an augmentation process from augmentation processes based on a probability table, in response to an acquisition of an input image; acquiring an augmented image by augmenting the input image based on the selected augmentation process; and recognizing an object from the augmented image based on a recognition model.

The selecting of the augmentation process may include determining a parameter of the selected augmentation process based on another probability table.

The image recognition method may further include: analyzing a characteristic of the input image; and selecting the probability table from probability tables, in response to the probability table corresponding to the analyzed characteristic.

The image recognition method may further include: receiving a user input designating the probability table; and selecting the probability table from a plurality of probability tables, in response to a reception of the user input.

The image recognition method may further include: collecting environmental information about a surrounding environment of an image recognition apparatus; and selecting the probability table from a plurality of probability tables, in response to the probability table corresponding to the environmental information.

The image recognition method may further include: updating the probability table based on an output calculated from the augmented image, using the recognition model.

The updating of the probability table may include: calculating a contribution score of each of the augmentation processes based on the output calculated from the augmented image, using the recognition model; and adjusting a probability that designates each of the augmentation processes in the probability table based on the contribution score.

The updating of the probability table may include calculating contribution scores for each parameter of an individual augmentation process among the augmentation processes.

The calculating of the contribution score may include calculating, from the augmented image, a contribution score of an augmentation process, among the augmentation processes, selected every time an object is recognized, and generating a contribution histogram by classifying and accumulating contribution scores of the selected augmentation processes based on the selected augmentation processes. The adjusting of the probability may include adjusting the probability based on the contribution histogram.

In another general aspect, a recognition model training method includes: selecting an augmentation process, among augmentation processes, based on a probability table in response to an acquisition of input data; acquiring augmented data by augmenting the input data based on the selected augmentation process, in response to the selecting of the augmentation process; and training a recognition model based on the augmented data.

The selecting of the augmentation process may include determining a parameter of the selected augmentation process based on another probability table.

The recognition model training method may further include: randomly selecting a new augmentation process based on the probability table, in response to an augmentation count of the input data being less than a threshold count; acquiring new augmented data by augmenting the input data based on the selected new augmentation process; and retraining the recognition model based on the new augmented data.

The selecting of the augmentation process may include acquiring n pieces of input data, and selecting the augmentation process based on the probability table for each of the n pieces of input data, wherein n is an integer greater than or equal to 1.

The recognition model training method may further include: analyzing a characteristic of the input data; and selecting the probability table from probability tables, in response to the probability table corresponding to the analyzed characteristic.

The recognition model training method may further include: updating the probability table based on an output calculated from the augmented data, using the recognition model.

The updating of the probability table may include calculating a contribution score of each augmentation process based on the output calculated from the augmented data, using the recognition model, and adjusting a probability that designates each augmentation process in the probability table based on the contribution score.

The updating of the probability table may include calculating contribution scores for each augmentation process, and calculating contribution scores for each parameter of an individual augmentation process among the augmentation processes.

The calculating of the contribution score may include calculating, from the augmented data, a contribution score of an augmentation process, among the augmentation processes, selected for each training, and generating a contribution histogram by classifying and accumulating contribution scores of the selected augmentation processes based on the selected augmentation processes. The adjusting of the probability may include adjusting the probability based on the contribution histogram.

In another general aspect, a non-transitory computer-readable storage medium stores instructions that, when executed by a processor, cause the processor to perform the method described above.

In another general aspect, a recognition model training apparatus includes: a data acquirer configured to acquire input data; and a processor configured to select an augmentation process based on a probability table, in response to an acquisition of the input data, to acquire augmented data by augmenting the input data based on the selected augmentation process, in response to the selection of the augmentation process, and to train a recognition model based on the augmented data.

Other features and aspects will be apparent from the following detailed description, the drawings, and the claims.

Figure 1:
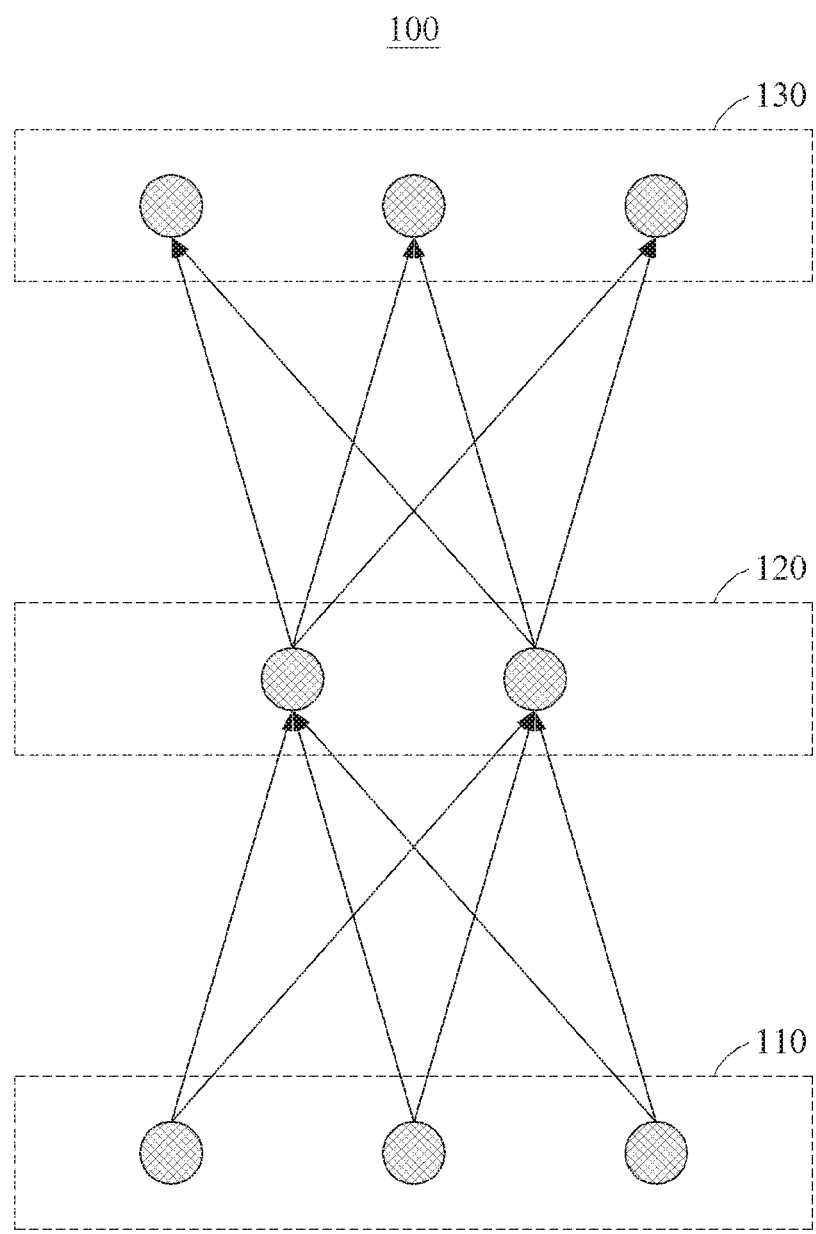
FIG. 1 illustrates an example of a configuration of a recognition model.

Throughout the drawings and the detailed description, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined herein, all terms used herein including technical or scientific terms have the same meanings as those generally understood. Terms defined in dictionaries generally used should be construed to have meanings matching with contextual meanings in the related art and are not to be construed as an ideal or excessively formal meaning unless otherwise defined herein.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 illustrates an example of a configuration of a recognition model.

A recognition model is a model designed to recognize data. For example, a processor may calculate output data indicating information inferred from input data by inputting the input data to the recognition model. A recognition model training apparatus may generate augmented data by applying an augmentation process to input data, and may train the recognition model based on the augmented data. Also, a data recognition apparatus may perform a recognition based on augmented data that is generated by applying an augmentation process to input data. For example, when input data is an input image, the data recognition apparatus may be referred to as an image recognition apparatus. The image recognition apparatus may acquire an augmented image by applying an augmentation process to the input image, and recognize an object from the augmented image based on a recognition model. In another example, when input data is an input speech, the data recognition apparatus may be referred to as a speech recognition apparatus. The speech recognition apparatus may acquire an augmented speech by applying an augmentation process to the input speech, and recognize a word or words from the augmented speech based on a recognition model.

Referring to FIG. 1, a recognition model may include, for example, a neural network 100. A method and an apparatus (hereinafter, referred to as a "data recognition apparatus") for performing a data recognition using the neural network 100 are provided. Also, a method and an apparatus (hereinafter, referred to as a "recognition model training apparatus") for training the neural network 100 are provided.

In the following description, a recognition includes a verification and an identification. The verification is an operation of determining whether input data is true or false, and the identification is an operation of determining which one of a plurality of labels is indicated by input data.

Hereinafter, a structure of the neural network 100 is described prior to description of a data recognition.

Referring to FIG. 1, the neural network 100 includes a plurality of layers that each include a plurality of nodes. Also, the neural network 100 includes connection weights that connect a plurality of nodes included in one of the plurality of layers to nodes included in another layer among the plurality of layers. In an example, a recognition model training apparatus acquires the neural network 100 from an internal database (DB) stored in a memory, or receives the neural network 100 from an external server via a communicator and acquires the neural network 100.

The neural network 100 is implemented by, for example, software, hardware or a combination thereof. In an example, the neural network 100 is referred to as an "artificial neural network (ANN)."

Nodes of the neural network 100 are connected to each other via edges with connection weights. A connection weight is a predetermined value of an edge, and is referred to as a "synaptic weight" or a "connection intensity."

In an example, as shown in FIG. 1, the neural network 100 includes a plurality of layers. For example, the neural network 100 includes an input layer 110, a hidden layer 120 and an output layer 130. The input layer 110 receives an input to perform training or recognition, and transfers the input to the hidden layer 120. The output layer 130 generates an output of the neural network 100 based on a signal received from the hidden layer 120. The hidden layer 120 is located between the input layer 110 and the output layer 130, and changes a training input of training data received via the input layer 110 to a value that is relatively more easily predictable.

Each of the input layer 110, the hidden layer 120, and the output layer 130 includes a plurality of nodes. A node included in the input layer 110 is referred to as an "input node," a node included in the hidden layer 120 is referred to as a "hidden node," and a node included in the output layer 130 is referred to as an "output node."

Input nodes included in the input layer 110 and hidden nodes included in the hidden layer 120 are connected to each other via edges with connection weights. Also, hidden nodes included in the hidden layer 120 and output nodes included in the output layer 130 are connected to each other via edges with connection weights.

A neural network may include a plurality of hidden layers, although not shown. A neural network including a plurality of hidden layers is referred to as a "deep neural network (DNN)." The DNN or may correspond to a convolutional neural network (CNN), a recurrent neural network (RNN), a deep belief network, a fully connected network, a bi-directional neural network, a restricted Boltzman machine, or may include different or overlapping neural network portions respectively with full, convolutional, recurrent, and/or bi-directional connections. Training of the DNN is referred to as "deep learning." For example, when the hidden layer 120 is assumed to include a first hidden layer, a second hidden layer and a third hidden layer, an output of a hidden node included in the first hidden layer is connected to hidden nodes included in the second hidden layer. Also, an output of a hidden node included in the second hidden layer is connected to hidden nodes included in the third hidden layer.

For example, the recognition model training apparatus and the data recognition apparatus input outputs of previous hidden nodes included in a previous hidden layer to each hidden layer via edges with connection weights, and generate outputs of hidden nodes included in each hidden layer based on an activation function and values obtained by applying connection weights to the outputs of the previous hidden nodes. In an example, to transmit an output to a next hidden node, a result of an activation function needs to exceed a threshold of a current hidden node. In this example, a node does not transmit a signal to a next node until reaching threshold activation strength through input vectors, and remains in an inactive state.

The recognition model training apparatus trains the neural network 100 through supervised learning. The recognition model training apparatus is implemented by, for example, a software module, a hardware module, or a combination thereof. The supervised learning is a scheme of inputting, to the neural network 100, a training input of training data together with a training output corresponding to the training input and updating connection weights of edges so that output data corresponding to the training output is output. Although the structure of the neural network 100 is expressed as a node structure in FIG. 1, examples are not limited to the node structure. For example, various data structures may be used to store a neural network in a memory storage.

The recognition model training apparatus defines an objective function to measure how close currently set connection weights are to an optimal value, continues to change the connection weights based on a result of the objective function, and repeatedly performs training. For example, the objective function is a loss function used to calculate a loss between an expected value to be output and an actual output value based on a training input of training data in the neural network 100. The recognition model training apparatus updates the connection weights by reducing a value of the loss function.

In an example, the recognition model training apparatus determines parameters of nodes included in a neural network using a gradient descent scheme based on an error that is propagated backwards to the neural network and based on output values of the nodes. For example, the recognition model training apparatus updates connection weights between nodes through error backpropagation learning. The error backpropagation learning is a scheme of estimating an error by a forward computation of given training data, propagating the estimated error backwards from an output layer to a hidden layer and an input layer, and updating connection weights to reduce an error. The neural network 100 is processed in an order of the input layer 110, the hidden layer 120, and the output layer 130, however, connection weights in the error backpropagation learning are updated in an order of the output layer 130, the hidden layer 120 and the input layer 110. For example, at least one processor uses a buffer memory configured to store layers or calculation data to process a neural network in a desired order.

Hereinafter, a data recognition and training based on a data augmentation will be described.

Figure 2:
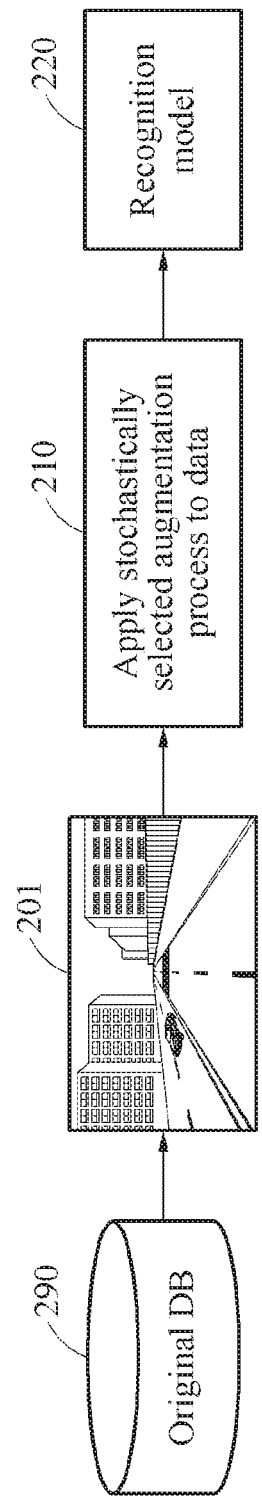
FIG. 2 illustrates an example of a data augmentation process.

FIG. 2 illustrates an example of a data augmentation process.

Referring to FIG. 2, a recognition model training apparatus acquires input data 201 from an original DB 290. Also, the recognition model training apparatus acquires an input image using an image sensor as well as the original DB 290. Although the input data 201 is an image as shown in FIG. 2, other types of input data are possible. For example, the input data 201 may be a speech input.

In operation 210, the recognition model training apparatus applies a stochastically selected augmentation process to data. In an example, in response to an augmentation process being selected, the recognition model training apparatus generates augmented data by applying the augmentation process to the input data 201. In another example, in response to an augmentation process not being selected, the recognition model training apparatus maintains an original input image. In an example in which the input data 201 is a speech input, in response to an augmentation process not being selected, the recognition model training apparatus maintains an original speech input. An example of a stochastic selection of an augmentation process will be described below with reference to FIG. 4. A recognition model 220 is, for example, the neural network 100 of FIG. 1. However, the disclosure not limited to such an example.

The recognition model training apparatus trains the recognition model 220 based on the augmented data or the original input image. In an example, in response to an augmentation process being selected, the recognition model training apparatus trains the recognition model 220 based on the augmented data. In another example, in response to an augmentation process not being selected, the recognition model training apparatus trains the recognition model 220 based on the original input image. Thus, the recognition model training apparatus trains the recognition model 220 so that a feature of data that is not augmented and a feature of the augmented data are reflected. The recognition model 220 is repeatedly trained based on a result of an objective function as described above with reference to FIG. 1.

Although an example of applying the augmentation process to the input data 201 in the recognition model training apparatus is mainly described, the disclosure is not limited to this example. For example, a data recognition apparatus also uses augmented data. The data recognition apparatus generates augmented data by applying an augmentation process selected based on a probability to the input data 201. The data recognition apparatus calculates an output corresponding to the augmented data from the augmented data based on the recognition model 220. For example, when the input data 201 is an image, the output corresponding to the augmented data may be a label that indicates an object appearing in the image. The label is, for example, an identification (ID) or a type of the object. The type of the object is a class of the object, for example, a human, an animal or an inanimate object. The ID of the object is, for example, a human's identity. In another example, when the input data 201 is a speech input (e.g., an input source sentence), the output corresponding to the augmented data may be a label that indicates a word or character included in the speech input. The following description of FIGS. 3 through 10 is applicable to both a data recognition and training of the recognition model 220.

In this disclosure, the augmentation process is an operation of converting the input data 201 into arbitrary other data for training or recognition. For example, when the input data 201 is an image, the augmentation process includes image processing, for example, blurring, deblurring, flipping, brightness enhancing, contrast limited adaptive histogram equalization (CLAHE), resizing, image domain translation based on a generative adversarial network (GAN), contrast enhancing, low-frequency filtering, or high-frequency filtering. However, the augmentation process is not limited to the foregoing examples, and includes, for example, all processes of converting data to enhance a performance of a deep learning machine learning structure.

The recognition model 220 trained based on the augmented data exhibits a recognition performance that is not biased towards a predetermined characteristic.

Figure 3:
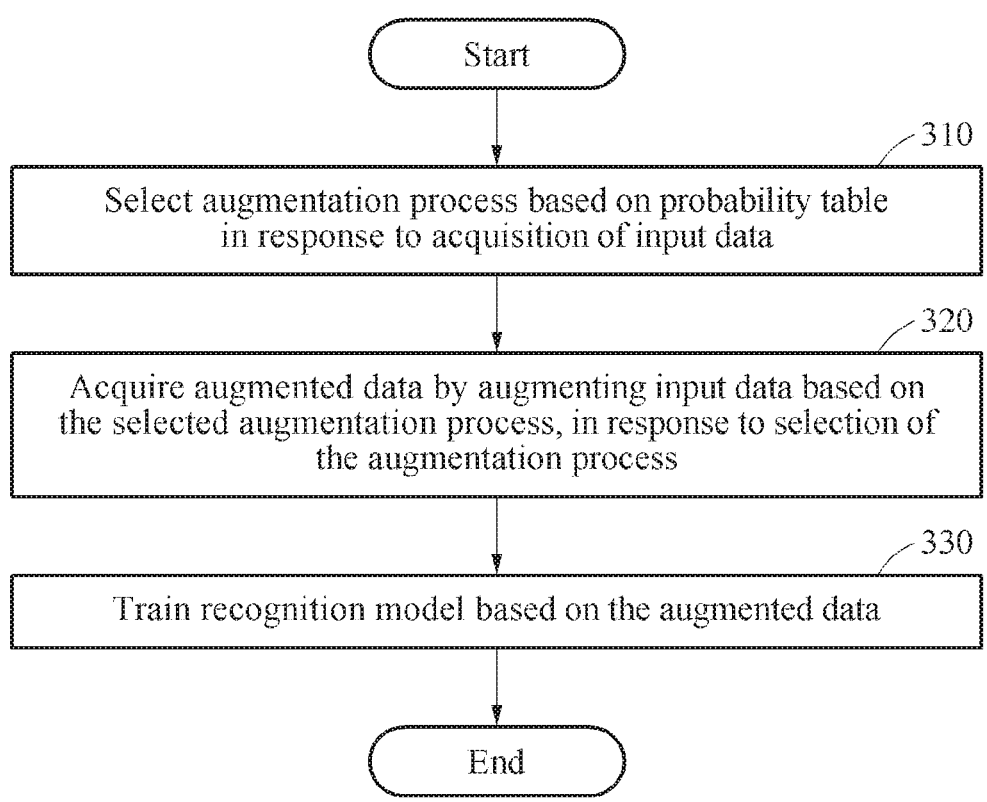
FIG. 3 is a flowchart illustrating an example of a recognition model training method.

FIG. 3 is a flowchart illustrating an example of a recognition model training method.

Referring to FIG. 3, in operation 310, a recognition model training apparatus selects an augmentation process based on a probability table in response to an acquisition of input data. For example, the recognition model training apparatus stochastically selects an augmentation process that is to be applied to the acquired input data, based on a probability table. The recognition model training apparatus selects one augmentation process from a plurality of augmentation processes based on a probability defined in the probability table. Also, the recognition model training apparatus determines whether to use original input data based on the probability table.

In the present disclosure, the probability table is a table that defines a probability that an augmentation process is selected. For example, the probability table defines a probability that each of k augmentation processes is selected, and a probability that an original input image is selected. In this example, k is an integer greater than or equal to "1." A probability defined in the probability table is determined in advance by a human, however, the manner in which a probability defined in the probability table is determined is not limited to this example. The probability table may be initially set as a default value, or may be updated by a method of FIG. 9 that will be described below. The default value is set to an equal probability (for example, "1/k") for each augmentation process.

In operation 320, the recognition model training apparatus acquires augmented data by augmenting the input data based on the selected augmentation process, in response to a selection of the augmentation process. For example, the recognition model training apparatus applies the selected augmentation process to the input data. The recognition model training apparatus converts the input data based on the selected augmentation process.

In operation 330, the recognition model training apparatus trains a recognition model based on the augmented data. The recognition model training apparatus calculates an output from the augmented data based on the recognition model. The recognition model training apparatus determines a value of an objective function based on the output. The recognition model training apparatus updates a connection weight of the recognition model based on the value of the objective function.

In response to an augmentation process not being selected, the recognition model training apparatus trains the recognition model based on the input data. The recognition model training apparatus calculates an output from the input data based on the recognition model, and trains the recognition model based on the output.

Although operation 330 of training the recognition model based on the augmented data is described in FIG. 3, the disclosure is not limited to this example. For example, a data recognition apparatus performs operations 310 and 320, and recognizes information indicated by the augmented data from the augmented data based on a pre-trained recognition model. When an input image is acquired as input data, the data recognition apparatus may be referred to as an image recognition apparatus.

For example, the data recognition apparatus selects a plurality of augmentation processes based on a probability table, in response to an acquisition of input data. The data recognition apparatus generates a plurality of pieces of augmented data by applying each of the plurality of selected augmentation processes to the input data. The data recognition apparatus selects an augmentation process from the plurality of augmentation processes based on a first probability table. The data recognition apparatus determines a parameter of the selected augmentation process based on a second probability table.

In an example, the data recognition apparatus analyzes a characteristic of the input data. For example, the data recognition apparatus analyzes the characteristic of the input data, similar to an operation of FIG. 8 that will be described below. The data recognition apparatus selects a probability table corresponding to the analyzed characteristic from a plurality of probability tables. However, the disclosure is not limited to selecting a probability table based on the characteristic of the input data.

In another example, the data recognition apparatus receives a user input from a user. The user input includes various controls input from a user, and includes, for example, a voice control using a microphone, a touch control using a touch screen, or a gaze control using an eye tracking. The data recognition apparatus provides a user with a user interface to guide a control to select an arbitrary probability table from a plurality of probability tables. The user inputs the above-described user input using the user interface. The data recognition apparatus identifies a probability table designated by the user from the user input. The data recognition apparatus selects a probability table designated by the user input from the plurality of probability tables in response to a reception of the user input. The user input is, for example, an input to select a probability table configured to augment an input image to an image with an increased brightness.

In another example, the data recognition apparatus (for example, an image recognition apparatus) collects environmental information about a surrounding environment of the data recognition apparatus. For example, the data recognition apparatus senses illuminance data using an illuminance sensor. The environmental information includes, for example, information indicating whether illuminance data indicates a low illuminance or a high illuminance. When the illuminance data indicates an illuminance less than a threshold illuminance, the environmental information includes information indicating a low illuminance state. When the illuminance data indicates an illuminance greater than or equal to the threshold illuminance, the environmental information includes information indicating a high illuminance state. The data recognition apparatus selects a probability table corresponding to the environmental information from a plurality of probability tables. For example, in response to the environmental information indicating a low illuminance state, the data recognition apparatus selects a probability table configured to augment an input image to an image with an increased brightness from a plurality of probability tables.

The data recognition apparatus calculates a plurality of outputs from a plurality of pieces of augmented data based on the recognition model. The data recognition apparatus recognizes an object based on the plurality of outputs. For example, the data recognition apparatus acquires a final recognition result by fusing outputs calculated from augmented images. When the data recognition apparatus is installed in an autonomous vehicle, the final recognition result is a result obtained by detecting all objects that exist in vicinity of the autonomous vehicle.

A fusion of a plurality of outputs includes, for example, an ensemble, an average calculation and a determination of a maximum value. In an example, when data with an ensemble of outputs calculated in correspondence with a plurality of augmentation processes exceeds a threshold, the data recognition apparatus installed in an autonomous vehicle determines that an object is detected. In another example, when an average of the plurality of outputs exceeds a threshold, the data recognition apparatus determines that an object is detected. In another example, when a maximum value (for example, a best case) of the plurality of outputs exceeds a threshold, the data recognition apparatus determines that an object is detected.

Thus, the data recognition apparatus acquires recognition results respectively corresponding to a plurality of augmentation processes using the plurality of augmentation processes, and determines the final recognition result based on the recognition results. By performing a recognition based on a recognition model using an image that is individually augmented by applying an augmentation process, the data recognition apparatus more accurately detects an object.

Also, the data recognition apparatus updates a probability table based on an output calculated from augmented data. The updating of the probability table by the data recognition apparatus is similar to an operation of FIG. 9 that will be described below.

Figure 4:
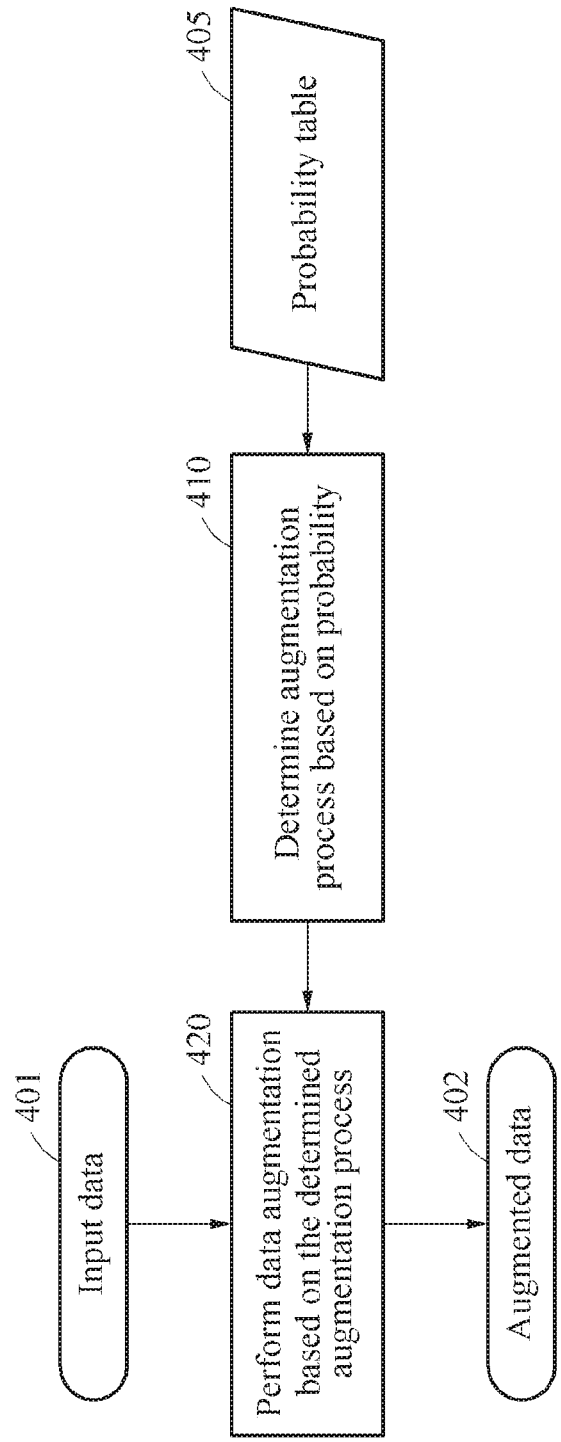
FIG. 4 illustrates an example of a data augmentation.

FIG. 4 illustrates an example of a data augmentation.

A recognition model training apparatus acquires input data 401. The input data 401 is acquired from a training DB as described above, however, the disclosure is not limited to such an example. For example, the recognition model training apparatus acquires an external image using an image sensor.

In operation 410, the recognition model training apparatus determines an augmentation process based on a probability using a probability table 405. The recognition model training apparatus stores the probability table 405 in a memory.

However, examples are not limited thereto, and the recognition model training apparatus receives the probability table 405 from a server.

In operation 420, the recognition model training apparatus performs a data augmentation based on the determined augmentation process. The recognition model training apparatus acquires augmented data 402 by performing the data augmentation.

Figure 5:
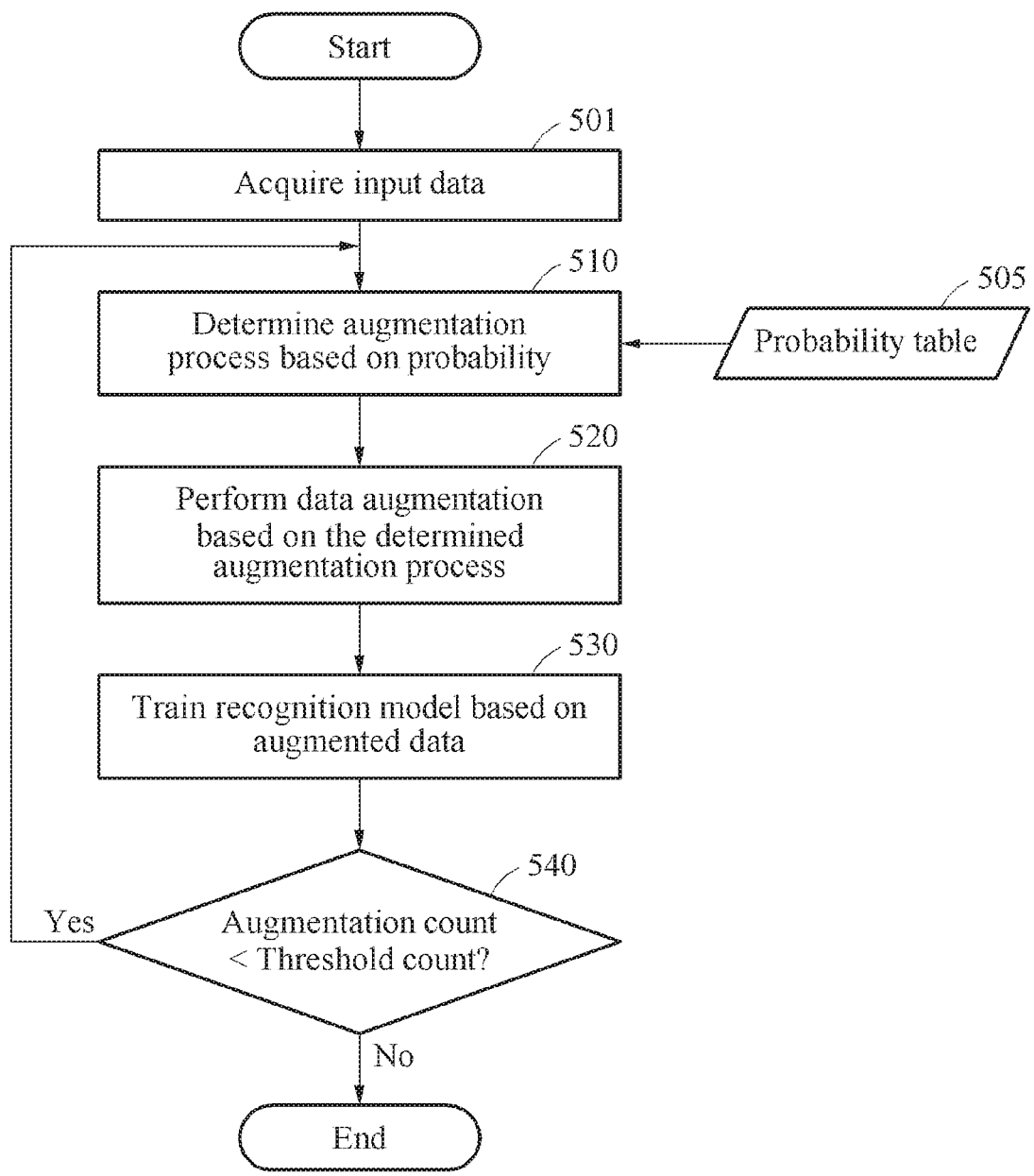
FIG. 5 illustrates an example of a data augmentation based on a probability table.

FIG. 5 illustrates an example of a data augmentation based on a probability table.

Referring to FIG. 5, in operation 501, a recognition model training apparatus acquires input data.

In operation 510, the recognition model training apparatus determines an augmentation process based on a probability using a probability table 505. As described above, the recognition model training apparatus randomly selects an augmentation process based on a probability defined by the probability table 505, or selects original input data.

In operation 520, the recognition model training apparatus performs a data augmentation based on the determined augmentation process. For example, the recognition model training apparatus converts the input data based on the determined augmentation process.

In operation 530, the recognition model training apparatus trains a recognition model based on augmented data.

In operation 540, the recognition model training apparatus determines whether an augmentation count of the input data is less than a threshold count. For example, in response to the augmentation count of the input data being less than a threshold count, the recognition model training apparatus randomly selects a new augmentation process based on the probability table 505. The recognition model training apparatus acquires new augmented data by augmenting the input data based on the new augmentation process. The recognition model training apparatus retrains the recognition model based on the new augmented data.

As described above, the recognition model training apparatus randomly selects an augmentation process for each training during training of the recognition model based on arbitrary input data by the threshold count. Thus, the recognition model training apparatus stochastically trains the recognition model on a feature associated with an individual augmentation process, to enhance a performance of the recognition model.

Figure 6:
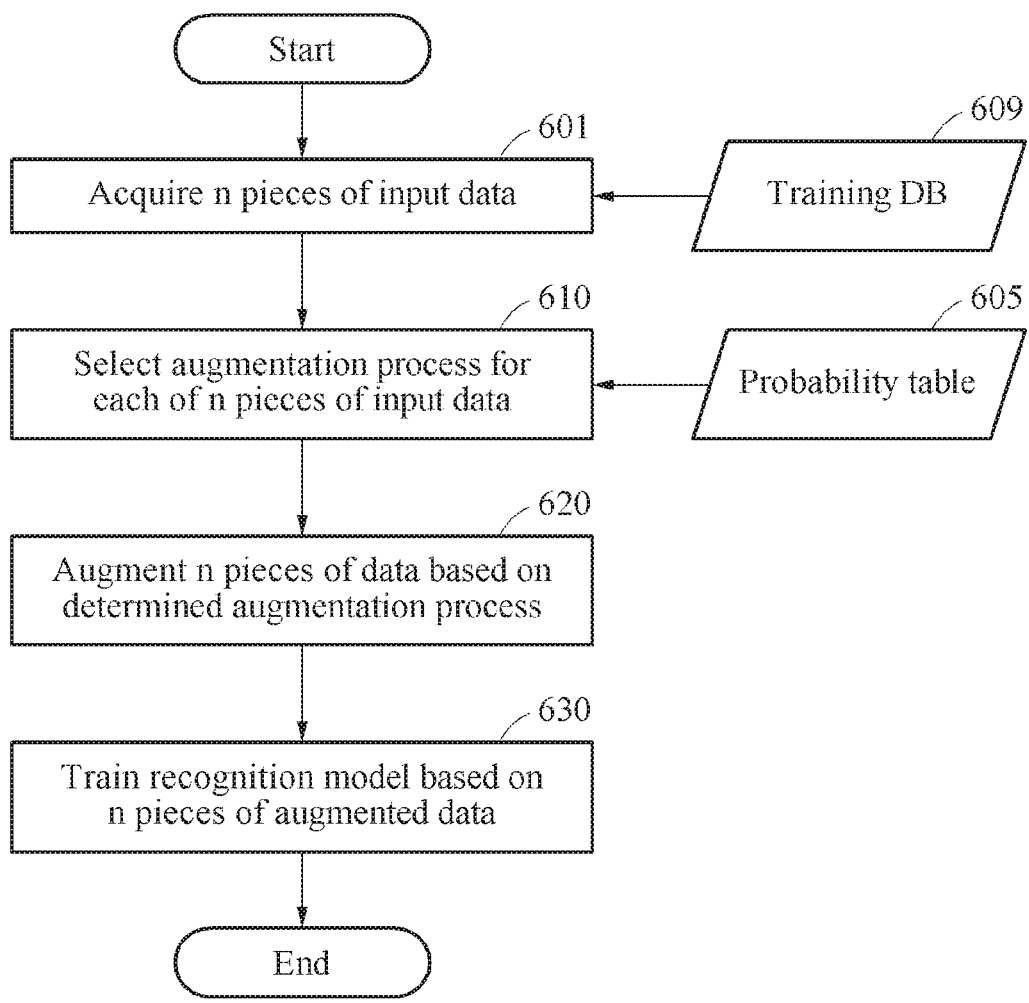
FIG. 6 illustrates an example of applying a probability table-based data augmentation to a training database (DB).

FIG. 6 illustrates an example of applying a probability table-based data augmentation to a training DB.

Referring to FIG. 6, in operation 601, a recognition model training apparatus acquires n pieces of input data. In this example, n is an integer greater than or equal to "1." For example, the recognition model training apparatus acquires n pieces of input data from a training DB 609. The training DB 609 includes data constructed for training, and includes, for example, a pair of a training input and a training output corresponding to the training input. For example, when a training input is an input image, a training output is a label (for example, a type of an object) indicated by the input image. The training DB 609 is stored in the recognition model training apparatus. However, the training DB 609 is not limited to being stored in the recognition model training apparatus. For example, the recognition model training apparatus may receive n pieces of input data from the training DB 609, which is stored in an external server.

In operation 610, the recognition model training apparatus selects an augmentation process for each of the n pieces of input data. For example, the recognition model training apparatus selects an augmentation process based on a probability table 605 for each of the n pieces of input data. The recognition model training apparatus selects augmentation processes n times independently of each other.

In operation 620, the recognition model training apparatus augments n pieces of data based on a determined augmentation process. For example, the recognition model training apparatus acquires n pieces of augmented data. However, operation 620 is not limited to this example, and a portion of the n pieces of data may be original input data, because the probability table 605 defines a probability that the original input data is selected as well as a probability that an augmentation process is selected.

In operation 630, the recognition model training apparatus trains a recognition model based on the n pieces of augmented data. For example, the recognition model training apparatus trains the recognition model n times based on each of the n pieces of augmented data. When a portion of the n pieces of augmented data is original input data, the recognition model training apparatus trains the recognition model based on the original input data.

Figure 7:
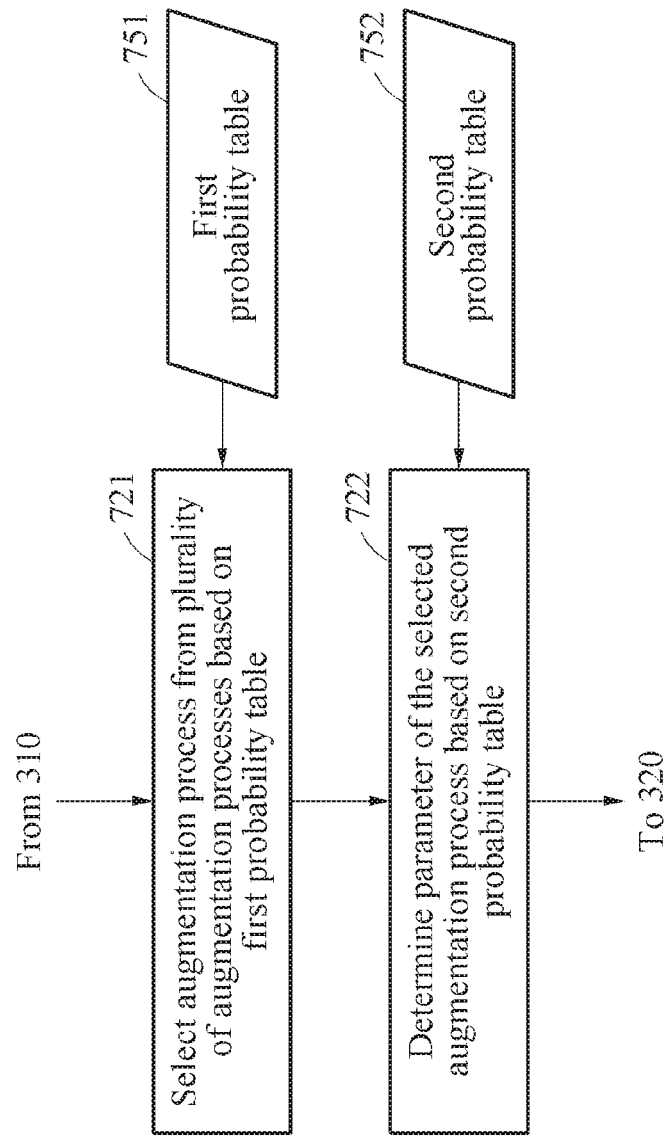
FIG. 7 illustrates an example of determining an augmentation process and a parameter of the augmentation process based on a first probability table and a second probability table.

FIG. 7 illustrates an example of determining an augmentation process and a parameter of the augmentation process based on a first probability table and a second probability table.

Referring to FIG. 7, in operation 721, the recognition model training apparatus selects an augmentation process from a plurality of augmentation processes based on a first probability table 751. The first probability table 751 is a table that defines a probability that each of a plurality of augmentation processes is selected and a probability that an original input image is selected.

In operation 722, the recognition model training apparatus determines a parameter of the selected augmentation process based on a second probability table 752. The second probability table 752 is a table that defines a probability that a parameter used in an arbitrary augmentation process is selected. The second probability table 752 is present for each individual augmentation process. The parameter is, for example, an adjustable numerical value for an arbitrary attribute (for example, a brightness) of an arbitrary augmentation process.

For example, when a brightness change is selected as an augmentation process based on the first probability table 751 in operation 721, a parameter used for the augmentation process is information associated with the brightness change. The second probability table 752 defines a probability that a degree (for example, a parameter) to which a brightness is changed is selected. The degree to which the brightness is changed is assumed to range from "−1" indicating a change to a lowest brightness to "1" indicating a change to a highest brightness, and individual sections are assumed to be separated into a unit of "1". For example, a degree to which a brightness is changed is defined as "−1," "0" and "1" that may be selected, and the second probability table 752 defines a probability that a parameter indicating the degree to which the brightness is changed is selected. For example, the second probability table 752 defines, as 33%, a probability that a parameter of "−1" is selected and a probability that a parameter of "1" is selected, and defines, as 0%, a probability that a parameter of "0" is selected. However, the second probability table 752 is merely an example to facilitate understanding, and other examples are possible.

A parameter includes, for example, a scale associated with resizing. The parameter includes, for example, a tile size associated with blurring, deblurring and CLAHE. A parameter for a Gaussian blurring process is a numerical value associated with a smoothing degree and a size of a filter.

However, the above-described examples are merely examples to facilitate understanding of the parameter, and other examples are possible. For a portion of augmentation processes (for example, flipping), a parameter may be absent.

Figure 8:
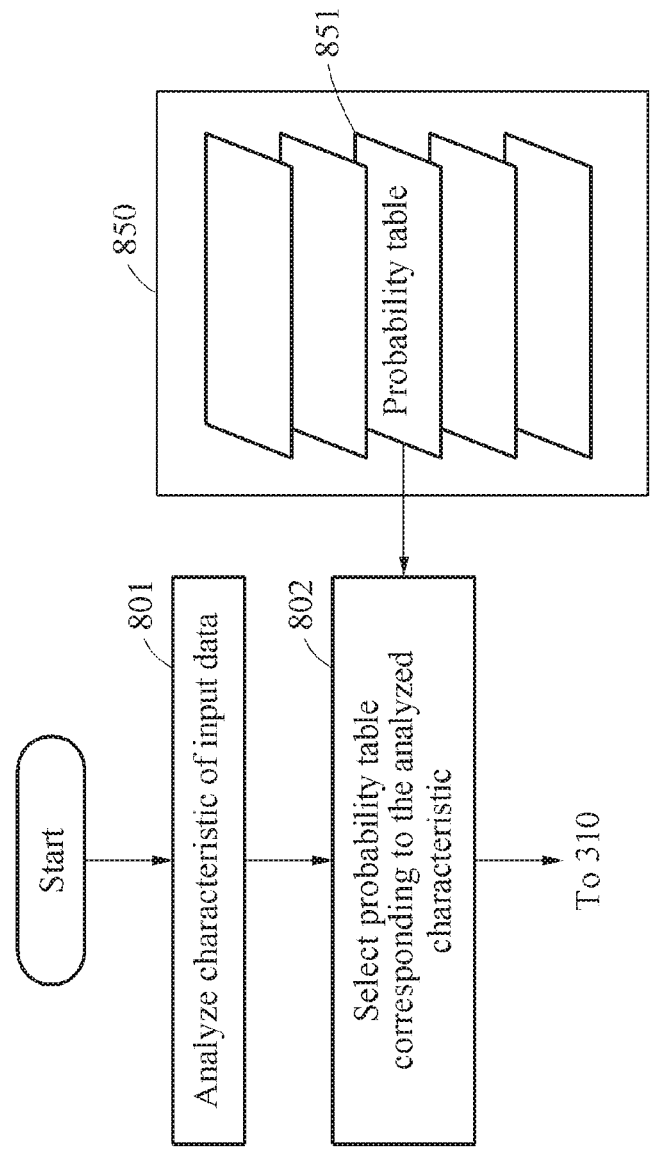
FIG. 8 illustrates an example of selecting a probability table based on a characteristic of input data.

FIG. 8 illustrates an example of selecting a probability table based on a characteristic of input data.

In operation 801, the recognition model training apparatus analyzes a characteristic of input data. When the input data is an image, the characteristic of the input data is estimated from image information. For example, input images are classified into bright images and dark images based on brightness of pixels. A bright image is an image having a brightness statistical value of pixels greater than a threshold brightness, and has a high brightness characteristic. The bright image is, for example, an image captured in daylight. A dark image is an image having a brightness statistical value of pixels less than or equal to the threshold brightness, and has a low brightness characteristic.

In operation 802, the recognition model training apparatus selects a probability table corresponding to the analyzed characteristic from a plurality of probability tables. For example, the recognition model training apparatus selects a probability table 851 corresponding to the analyzed characteristic from a plurality of probability tables 850.

Thus, the recognition model training apparatus analyzes the characteristic of the input data and selects the probability table 851 with a ratio optimized for the analyzed characteristic.

Figure 9:
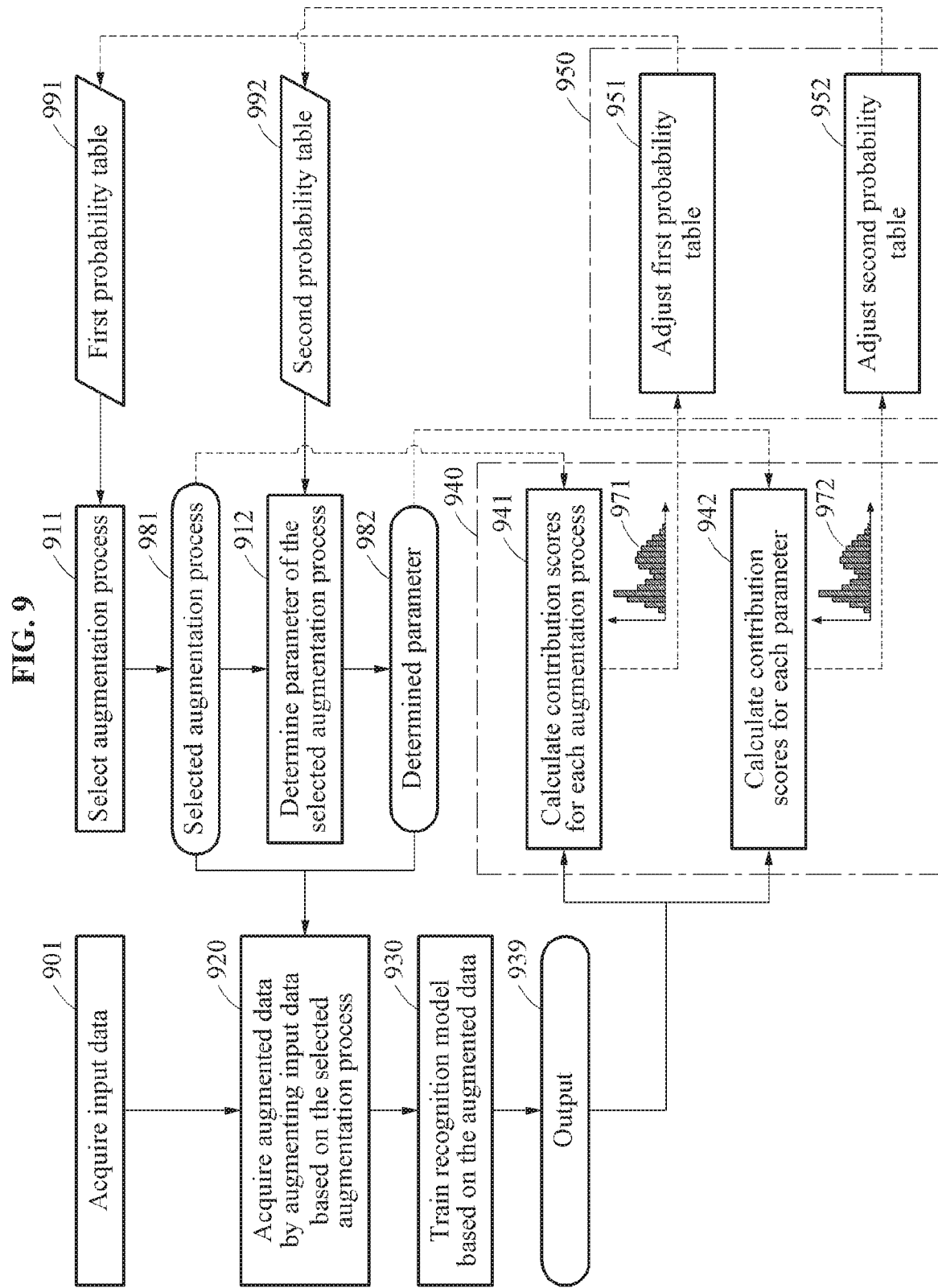
FIG. 9 illustrates an example of updating a probability table.

FIG. 9 illustrates an example of updating a probability table.

Referring to FIG. 9, in operation 901, a recognition model training apparatus acquires input data.

In operation 911, the recognition model training apparatus selects an augmentation process 981 based on a first probability table 991. In operation 912, the recognition model training apparatus determines a parameter of the selected augmentation process 981.

In operation 920, the recognition model training apparatus acquires augmented data by augmenting the input data based on the selected augmentation process 981.

In operation 930, the recognition model training apparatus trains a recognition model based on the augmented data. The recognition model training apparatus calculates an output 939 by inputting the augmented data to the recognition model. For example, when a given task is a training of a deep learning model, the output 939 may be a cost of an objective function. When the given task is an object category classification based on a deep learning model, the output 939 may be a label indicating a corresponding category.

The recognition model training apparatus updates the probability table based on the output 939 calculated from the augmented data using the recognition model.

For example, in operation 940, the recognition model training apparatus calculates a contribution score of each augmentation process based on the output 939 calculated from the augmented data, using the recognition model. The contribution score is a score calculated from the output 939, and indicates a degree to which a corresponding augmentation process contributes to an accuracy of a recognition. For example, when a loss between the output 939 and a label decreases, a contribution score determined by the recognition model training apparatus increases. For example, when a given task is a training of a deep learning model, an increment in cost values calculated for each training may be a contribution score.

In operation 941, the recognition model training apparatus calculates contribution scores for each augmentation process. For example, the recognition model training apparatus calculates the output 939 from arbitrary augmented data. The recognition model training apparatus calculates a contribution score of an augmentation process applied to augmented data from the output 939. Also, the recognition model training apparatus calculates, from the augmented data, a contribution score of the augmentation process 981 selected for each training. The recognition model training apparatus generates a contribution histogram by classifying and accumulating contribution scores of selected augmentation processes 981 based on augmentation processes. A first histogram 971 of FIG. 9 is a contribution histogram of contribution scores accumulated for each augmentation process. In the first histogram 971, a horizontal axis represents a label of an augmentation process, and a vertical axis represents contribution scores accumulated for each augmentation process. A contribution histogram is normalized.

In operation 942, the recognition model training apparatus calculates contribution scores for each parameter of an individual augmentation process. For example, the recognition model training apparatus calculates a contribution score of a parameter 982 of an augmentation process applied to augmented data, from the output 939. The recognition model training apparatus generates a second histogram 972 by classifying and accumulating contribution scores based on augmentation processes. In the second histogram 972, a horizontal axis represents a parameter (for example, a degree to which a brightness is changed), and a vertical axis represents contribution scores accumulated for each parameter. Although FIG. 9 shows merely one example of the second histogram 972, examples are not limited thereto. For example, parameters may exist for each of a plurality of attributes (for example, a brightness, or a tile size) of an arbitrary augmentation process. For the augmentation process, the recognition model training apparatus generates second histograms 972 for each of the plurality of attributes.

In operation 950, the recognition model training apparatus adjusts a probability that designates each augmentation process in the probability table based on the contribution score. For example, the recognition model training apparatus adjusts the probability based on the contribution histogram.

In operation 951, the recognition model training apparatus adjusts the first probability table 991. The recognition model training apparatus changes, based on the first histogram 971, a probability defined in the first probability table 991. The recognition model training apparatus updates the first probability table 991 based on a percentage of contribution scores accumulated for each augmentation process.

In operation 952, the recognition model training apparatus adjusts the second probability table 992. The recognition model training apparatus changes, based on the second histogram 972, a probability defined in the second probability table 992. The recognition model training apparatus updates the second probability table 992 based on a percentage of contribution scores accumulated for each individual parameter.

Figure 10:
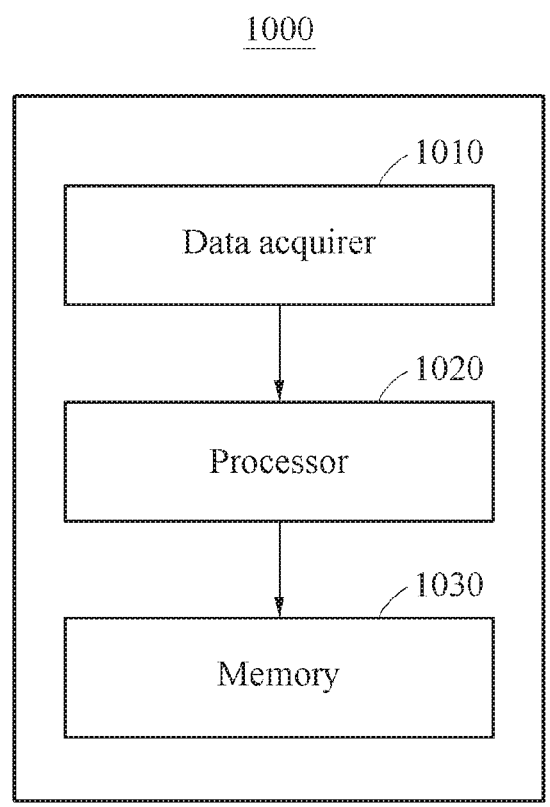
FIG. 10 is a block diagram illustrating an example of an apparatus for performing a data augmentation.

FIG. 10 is a block diagram illustrating an example of an apparatus 1000 for performing a data augmentation. The apparatus 1000 may include, for example, a recognition model training apparatus, or a data recognition apparatus. The data recognition apparatus may also be referred to as an image recognition apparatus, when an image is recognized by the data recognition apparatus.

Referring to FIG. 10, the apparatus 1000 includes a data acquirer 1010, a processor 1020, and a memory 1030. The apparatus 1000 is installed in, for example, an autonomous vehicle.

The data acquirer 1010 acquires input data. In an example, the data acquirer 1010 acquires input data from a DB. In another example, the data acquirer 1010 acquires input data using a sensor. The data acquirer 1010 may include an image sensor.

The processor 1020 selects an augmentation process based on a probability table in response to an acquisition of the input data. In response to a selection of the augmentation process, the processor 1020 acquires augmented data by augmenting the input data based on the selected augmentation process.

In an example, a processor 1020 of a recognition model training apparatus trains a recognition model based on the augmented data. In another example, a processor 1020 of an image recognition apparatus recognizes an object from an augmented image based on a recognition model.

However, an operation of the processor 1020 is not limited to the above-described operations, and the processor 1020 may perform the operations described above with reference to FIGS. 1 through 9.

The memory 1030 stores a recognition model. Also, the memory 1030 stores a training DB. The memory 1030 temporarily or permanently store information used to recognize data and information used to train a recognition model.

The apparatus 1000 stochastically applies various augmentation processes to input data. Also, the apparatus 1000 adaptively selects an optimum augmentation process, and further enhances a performance of a recognition model. For example, a probability-based augmentation process is used to effectively grow a deep learning model based on a convolutional neural network (CNN). Additionally, the probability-based augmentation process may be used to grow a deep learning model based on recurrent neural network (RNN), a deep belief network, a fully connected network, a bi-directional neural network, a restricted Boltzman machine, or a neural network including different or overlapping neural network portions respectively with full, convolutional, recurrent, and/or bi-directional connections.

In an example of neural network processing operations using training results obtained through an augmentation process described above, the apparatus 1000 may be configured to process image data in an input image to the apparatus 1000 to extract information about the input image for image recognition, image verification, or image classification. For example, the apparatus 1000 performs convolution with respect to image data, or one or more input feature maps corresponding to the input image, to generate an output feature map. The apparatus 1000 generates an image recognition output, an image verification indication, or an image classification output based on information in the output feature map. That is, the neural network apparatus 1000 may indicate the result of the image recognition, verification or classification, either explicitly or implicitly. For example, the recognized, verified, or classified image may be explicitly indicated through display in text form on a display of the apparatus 1000 or audibly fed back to the user or another user, or implicit indications may be provided through additional operations, or selective non-operations, of the apparatus 1000 based on the result of the image recognition, verification, or classification.

According to another example of neural network processing operations using training results obtained through an augmentation process described above, the apparatus 1000 may be configured to process audio data in voice entry to extract information about the voice entry for voice recognition or speech-to-text translation of the voice entry. For example, the apparatus 1000 performs convolution with respect to one or more input feature maps corresponding to the voice entry to generate an output feature map. The apparatus 1000 generates a voice recognition output or a text translation output based on information in the output feature map. That is, the apparatus 1000 may indicate the result of the speech recognition or speech-to-text translation, either explicitly or implicitly. For example, the recognized speech may be explicitly indicated through display in text form on a display of the apparatus 1000 or audibly fed back to the user or another user, or implicit indications may be provided through additional operations, or selective non-operations, of the apparatus 1000 based on the result of the speech recognition. For example, the apparatus 1000 may further perform a translation operation based on the recognition result, unlock the apparatus 1000 when the apparatus 1000 is a mobile device, or perform other operations of such an electronic device example.

Figure 11:
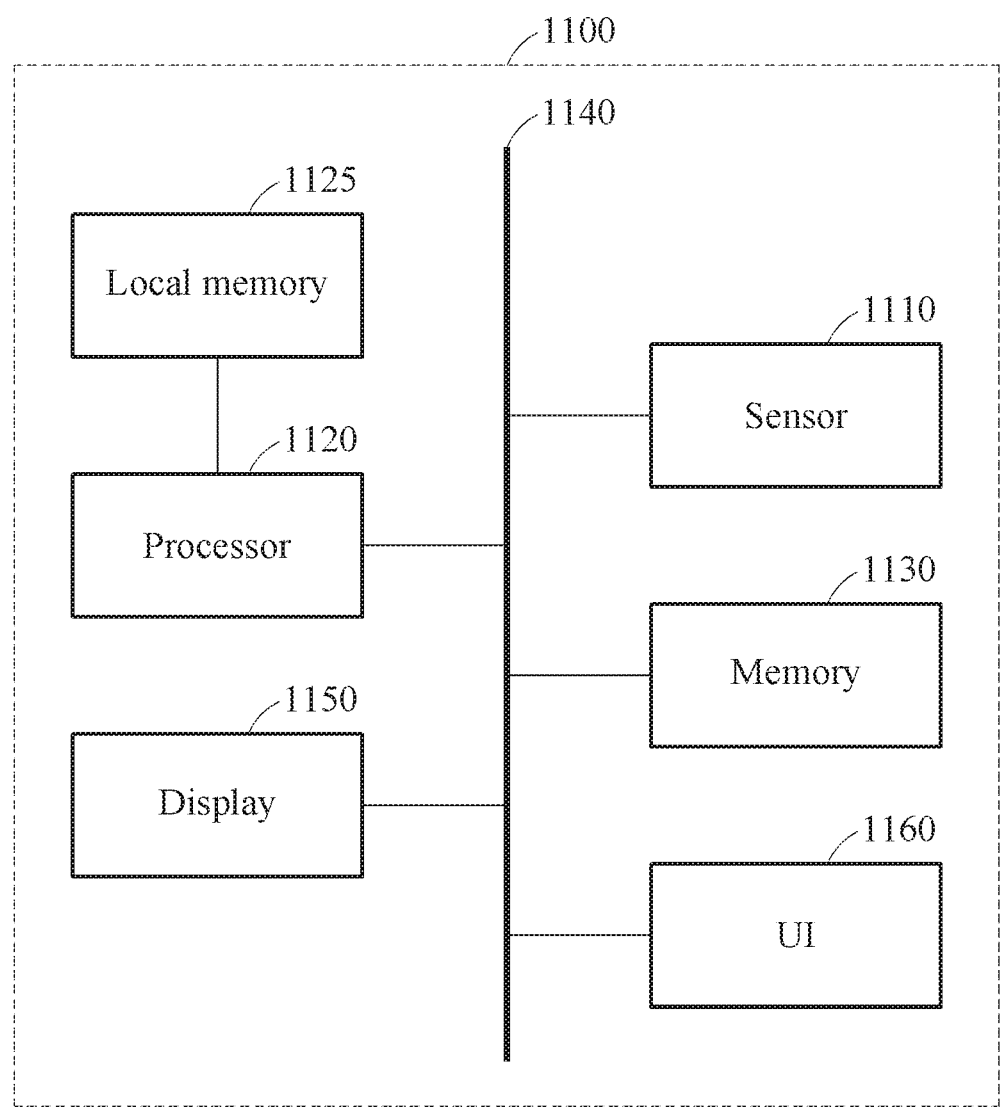
FIG. 11 is a diagram illustrating an example of an electronic system or device configured to implement a neural network.

FIG. 11 is a diagram illustrating an example of an electronic system or device 1100 configured to implement a neural network.

Referring to FIG. 11, the electronic system or device 1100 includes a sensor 1110, a processor 1120, a local memory 1125, a memory 1130, a display 1150, and a user interface (UI) 1160. The sensor 1110, the processor 1120, the memory 1130, the display 1150, and the UI 1160 communicate with each other via a bus 1140. The electronic system or device 1100 may correspond to the apparatus 1000 of FIG. 10, and may implement any one or more or all of the above processes or methods. As a non-limiting example, the processor 1120 may correspond to processor 1020 of FIG. 10, and/or the memory 1130 may correspond to the memory 1030 of FIG. 10. The local memory 1125 may be one or more temporary or local buffers/memories, while the memory 1130 may store a database from which kernel elements, feature maps, weight elements, voice elements, and/or image elements may be loaded from and into the local memory 1825. In an example, the local buffers/memories may be memories of the processor 1120 or buffers/memories directly connected to the processor 1120, e.g., configured for rapidly transferring data to/from the processor 1120 and the local memory 1125, noting that alternatives are also available. The local memory 1125 may further be allocated to temporarily store convolutional output results of a particular layer of the neural network, or all layers of the neural network, the ultimate output results of which may be stored in the memory 1130 and/or respectively used for inputs to a next layer. In an example, except for purposes of an input to a next layer, the convolutional results of each layer may discarded and only final layer(s) output results of the neural network stored to the memory 1130 or used for another process, such as in cooperation with recognition and display operations of an autonomous vehicle or a mobile phone as the electronic system or device 1100. As also noted, the processor 1120 may represent one or more processors that are configured as any one or any combination of the above neural network processing apparatuses or augmentation apparatuses, as non-limiting examples.

The sensor 1110 includes, for example, a microphone and/or an image sensor or camera to sense video data and audio data to recognize, reject, or verify an object, for example. In an example, the sensor 1110 senses an image using a well-known scheme, for example, a scheme of converting an optical image to an electronic signal. An output of the sensor 1110 is transferred to the processor 1120 or the memory 1130, and output of the sensor 1110 may also be transferred directly to, or operate as, an input layer of a neural network discussed herein.

The processor 1120 may be configured to perform one or more or all processes described with reference to FIGS. 1-10. For example, to perform a recognition, rejection, or verification operation, the processor 1820 may recognize, reject, or verify the input data based on neural network processing operations using training results obtained through the augmentation processes described above with respect to FIGS. 1-10. The neural network processing operations may also efficiently processes a convolution operation in a neural network by suitably using a dispatching pattern according to precisions (or bit widths) of individual operands and parallelism of individual convolution operations to be processed in the neural network that may be different from the neural network from which the kernels were trained, for example. The result of any of the recognition, rejection, or verification operations may be output through the display 1150. In addition, user adjustments or selective operations of the augmentation process and/or neural network processing operations may be provided by UI 1160, which may include a touch screen or other input/output device/system. As noted above and described below, the processor 1120 may be a graphics processor unit (GPU), reconfigurable processor, or have any other type of multi- or single-processor configuration.

In addition to operations of one or more of the neural network processing apparatuses and/or operations described in FIGS. 1-11 as noted above, the memory 1130 may further store instructions which, when executed by processor 1120, cause the processor 1120 to perform additional operations, functions, and controls of the electronic system or device 1100, such as a user interface of the electronic system. The electronic system or device 1100 may be connected to an external device, for example, a personal computer (PC) or a network, via an input/output device of the electronic system, to exchange data with the external device. The electronic system or device 1100 may be an autonomous vehicle, or may be various electronic devices including, as only non-limiting examples, a mobile device, for example, a mobile telephone, a smartphone, a wearable smart device (such as, a ring, a watch, a pair of glasses, glasses-type device, a bracelet, an ankle bracket, a belt, a necklace, an earring, a headband, a helmet, a device embedded in the cloths, or an eye glass display (EGD)), a computing device, for example, a server, a laptop, a notebook, a subnotebook, a netbook, an ultra-mobile PC (UMPC), a tablet personal computer (tablet), a phablet, a mobile internet device (MID), a personal digital assistant (PDA), an enterprise digital assistant (EDA), an ultra mobile personal computer (UMPC), a portable lab-top PC, electronic product, for example, a robot, a digital camera, a digital video camera, a portable game console, an MP3 player, a portable/personal multimedia player (PMP), a handheld e-book, a global positioning system (GPS) navigation, a personal navigation device, portable navigation device (PND), a handheld game console, an e-book, a television (TV), a high definition television (HDTV), a smart TV, a smart appliance, a smart home device, or a security device for gate control, various Internet of Things (IoT) devices, or any other device capable of wireless communication or network communication consistent with that disclosed herein.

According to examples, through a data augmentation, a recognition model training apparatus generates a deep learning recognition model that may allow an autonomous driving-related object to be more accurately recognized. Also, through the data augmentation, an image recognition apparatus adaptively recognizes an actual autonomous vehicle operating environment in association with an application of an autonomous driving deep learning.

The recognition model training apparatus applies an augmentation process immediately after input data is acquired, instead of needing to preserve a large amount of augmentation results in advance, thereby reducing costs for additional data storage and extraction. Also, the recognition model training apparatus efficiently generates augmentation results of all parameters of each augmentation process. Thus, a data augmentation is effective for an on-device configuration (for example, an autonomous vehicle, or a smartphone) with insufficient resources.

According to examples, because a data augmentation is based on a probability table, the data augmentation may be a stochastic scheme. Augmented data includes additional information of original input data, and thus it is possible to have an effect of enhancing a performance of training and inference of a deep learning model.

According to examples, a recognition model training apparatus adaptively updates a probability table by performing the above-described training method continuously or every time period.

The data acquirer 1010, the processor 1020, and the memory 1030 in FIG. 10, and the processor 1120, the local memory 1125, the memory 1130, and the display 1150 in FIG. 11 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 3 through 9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An image recognition method, comprising:
analyzing a characteristic of an input image, in response to an acquisition of the input image;
selecting a probability table from probability tables, in response to the probability table corresponding to the analyzed characteristic;
selecting an augmentation process from augmentation processes based on the selected probability table;
acquiring an augmented image by augmenting the input image based on the selected augmentation process; and
recognizing an object from the augmented image based on a recognition model.

2. The image recognition method of claim 1, wherein the selecting of the augmentation process comprises determining a parameter of the selected augmentation process based on another probability table.

3. The image recognition method of claim 1, further comprising:
receiving a user input designating the probability table; and
selecting the probability table from a plurality of probability tables, in response to a reception of the user input.

4. The image recognition method of claim 1, further comprising:
collecting environmental information about a surrounding environment of an image recognition apparatus; and
selecting the probability table from a plurality of probability tables, in response to the probability table corresponding to the environmental information.

5. The image recognition method of claim 1, further comprising:

updating the probability table based on an output calculated from the augmented image, using the recognition model.

6. The image recognition method of claim 5, wherein the updating of the probability table comprises:
calculating a contribution score of each of the augmentation processes based on the output calculated from the augmented image, using the recognition model; and
adjusting a probability that designates each of the augmentation processes in the probability table based on the contribution score.

7. The image recognition method of claim 6, wherein the updating of the probability table comprises calculating contribution scores for each parameter of an individual augmentation process among the augmentation processes.

8. The image recognition method of claim 6, wherein the calculating of the contribution score comprises
calculating, from the augmented image, a contribution score of an augmentation process, among the augmentation processes, selected every time an object is recognized, and
generating a contribution histogram by classifying and accumulating contribution scores of the selected augmentation processes based on the selected augmentation processes, and
the adjusting of the probability comprises adjusting the probability based on the contribution histogram.

9. A recognition model training method, comprising:
analyzing a characteristic of an input data, in response to an acquisition of the input data;
selecting a probability table from probability tables, in response to the probability table corresponding to the analyzed characteristic;
selecting an augmentation process, among augmentation processes, based on the selected probability table;
acquiring augmented data by augmenting the input data based on the selected augmentation process, in response to the selecting of the augmentation process; and
training a recognition model based on the augmented data.

10. The recognition model training method of claim 9, wherein the selecting of the augmentation process comprises
determining a parameter of the selected augmentation process based on another probability table.

11. The recognition model training method of claim 9, further comprising:
randomly selecting a new augmentation process based on the probability table, in response to an augmentation count of the input data being less than a threshold count;
acquiring new augmented data by augmenting the input data based on the selected new augmentation process; and
retraining the recognition model based on the new augmented data.

12. The recognition model training method of claim 9, wherein the selecting of the augmentation process comprises
acquiring n pieces of input data, and
selecting the augmentation process based on the probability table for each of the n pieces of input data, and
wherein n is an integer greater than or equal to 1.

13. The recognition model training method of claim 9, further comprising:
updating the probability table based on an output calculated from the augmented data, using the recognition model.

14. The recognition model training method of claim 13, wherein the updating of the probability table comprises
calculating a contribution score of each augmentation process based on the output calculated from the augmented data, using the recognition model, and
adjusting a probability that designates each augmentation process in the probability table based on the contribution score.

15. The recognition model training method of claim 14, wherein the updating of the probability table comprises
calculating contribution scores for each augmentation process, and
calculating contribution scores for each parameter of an individual augmentation process among the augmentation processes.

16. The recognition model training method of claim 14, wherein the calculating of the contribution score comprises
calculating, from the augmented data, a contribution score of an augmentation process, among the augmentation processes, selected for each training, and
generating a contribution histogram by classifying and accumulating contribution scores of the selected augmentation processes based on the selected augmentation processes, and
wherein the adjusting of the probability comprises adjusting the probability based on the contribution histogram.

17. A non-transitory computer-readable storage medium storing instructions that, when executed by a processor, cause the processor to perform the method of claim 1.

18. A recognition model training apparatus, comprising:
a data acquirer, including an image sensor, configured to acquire input data; and
a processor configured to analyze a characteristic of an input image in response to an acquisition of the input image, to select a probability table from probability tables in response to the probability table corresponding to the analyzed characteristic, to select an augmentation process based on the selected probability table, to acquire augmented data by augmenting the input data based on the selected augmentation process, in response to the selection of the augmentation process, and to train a recognition model based on the augmented data.

* * * * *